United States Patent [19]
Lee

[11] Patent Number: 5,935,254
[45] Date of Patent: Aug. 10, 1999

[54] COMPUTER SYSTEM FOR CUTTING OFF POWER BY KEY INPUT SIGNALS OR PROGRAMMING AND HAVING A RESET SWITCH FOR RESETTING AND SUPPLYING POWER

[75] Inventor: Chang-Ho Lee, Goonpo, Rep. of Korea

[73] Assignee: SamSung Electronics Co., Ltd., Suwon, Rep. of Korea

[21] Appl. No.: 08/819,112

[22] Filed: Mar. 17, 1997

[30] Foreign Application Priority Data

May 7, 1996 [KR] Rep. of Korea ............... 96-14791

[51] Int. Cl.$^6$ .................................................. G06F 1/24
[52] U.S. Cl. ........................ 713/340; 714/14; 713/310
[58] Field of Search ................ 395/750.01, 750.02, 395/750.03, 750.04, 750.07, 750.05, 750.06, 182.12, 182.01, 652, 651, 183.12; 364/707; 713/300, 310, 320, 322, 324, 330, 340, 2, 1, 321; 714/14, 3, 36

[56] References Cited

U.S. PATENT DOCUMENTS

| | | | |
|---|---|---|---|
| 4,614,880 | 9/1986 | Go et al. | 327/143 |
| 4,975,798 | 12/1990 | Edwards et al. | 361/56 |
| 5,008,846 | 4/1991 | Inoue | 364/707 |
| 5,157,270 | 10/1992 | Sakai | 307/66 |
| 5,203,000 | 4/1993 | Folkes et al. | 395/750.08 |
| 5,237,698 | 8/1993 | Bazes | 395/182.21 |
| 5,410,713 | 4/1995 | White et al. | 395/750.07 |
| 5,450,003 | 9/1995 | Cheon | 323/272 |
| 5,513,358 | 4/1996 | Lundberg et al. | 395/750.07 |
| 5,513,359 | 4/1996 | Clark et al. | 395/750.05 |
| 5,543,741 | 8/1996 | Purits | 327/143 |
| 5,570,050 | 10/1996 | Conary | 327/143 |

Primary Examiner—Thomas C. Lee
Assistant Examiner—Harold Kim
Attorney, Agent, or Firm—Robert E. Bushnell, Esq.

[57] ABSTRACT

In a computer system, the supply of a source voltage to a main computer block is started by using a reset switch provided for resetting the main computer block and cut off by specific key input signals from a keyboard or by programming in the computer. The main computer block includes a switching mode power supply SMPS for providing an operating power and a stand-by voltage to the main computer block, a power-on signal generator for generating a power-on signal to the SMPS by the reset switch, and a power-off signal generator for generating a signal for inverting the power-on signal generated from the power-on signal generator to a power-off signal.

14 Claims, 5 Drawing Sheets

COMPUTER SYSTEM FOR CUTTING OFF POWER BY KEY INPUT SIGNALS OR PROGRAMMING AND HAVING A RESET SWITCH FOR RESETTING AND SUPPLYING POWER

CLAIM OF PRIORITY

This application makes claims all benefits accruing under 35 U.S.C. §119 from an application for A COMPUTER SYSTEM WITH A SIMPLIFIED POWER CONTROL earlier filed in the Korean Industrial Property Office on May 7, 1996 and there duly assigned Ser. No. 14791/1996.

BACKGROUND OF THE INVENTION

1. Field of the Invention

The present invention relates to a computer system with a simplified power control function, and more particularly, to a computer system having a power supply section for starting a supply of a source voltage to the main computer block therein by means of a reset switch provided for resetting the main computer block without the use of a power switch and for interrupting the supply of the source voltage by either a combination of specific key input signals or by programming.

2. Description of the Related Art

As well known in the art, computer systems may embody several sorts of power control systems: a power control system operated by means of a power switch, a power control system which operates in response to a combination of specific key input signals from a keyboard, a power control system operated by means of a remote control, and a power control system capable of restarting the supply of a source voltage to the main computer block in response to a specific key input signal from the keyboard.

The above-noted power control systems may be selectively adapted to a personal computer system, while in an upgraded computer system, several power control systems may be embodied.

First, to supply a source voltage to the main computer block by means of a power switch, two methods have been utilized, one of which is to supply the source voltage by means of a power switch provided on an AC (Alternating Current) line and the other is to supply the source voltage upon the detection of the operation of a soft switch (e.g., any key on the keyboard), which is operated with a DC (Direct Current) voltage supplied from a power supply contained within the computer system.

The former method is utilized to control electrical connection/non-connection (ON/OFF) of the AC line, which is connected to the power supply in the computer system, by using a physical switch. This method can cause circuit damage to an SMPS (switching mode power supply) which is caused by a leakage current occurring upon starting or cutting off a source voltage to the main computer block in response to the ON/OFF connection of the AC line.

Also, the latter method is utilized to cut off a source voltage to the main computer block by using a soft switch, which is operated with a DC voltage of a power supply contained therein. In this method, an AC voltage supplied through the AC line to the power supply is not cut off even if a source voltage to the main computer block is cut off by using the soft switch. But this method has a disadvantage in that the supply of the source voltage to the main computer block may be cut off by a user's mistake or intention by another person while the computer system is operating because of the sensitive operation of the soft switch, resulting in a poor protection of the computer system.

In order to solve the above described problem of the power control system operated by means of the ON/OFF connection of a power switch, a method for controlling the power supply in accordance with a combination of specific key input signals has been proposed. In this method, an SMPS contained within the computer system must continue to provide a standby current to a keyboard controller besides a keyboard in order that the keyboard controller can detect the combination of the specific key input signals supplied from the keyboard. When the combination thereof is detected, the SMPS starts to supply the source voltage to the main computer block. In this method, the combination of the specific key input signals or the power switch is also used to cut off the supply of the source voltage to the main computer block. This method has a advantage of a good protection of the computer system operation, as compared with the method using the soft switch, but a disadvantage of a large current-consumption because a source voltage must always be supplied for the keyboard operation. Also, when that the keyboard is separated from the main computer block, it is impossible to control the supply or the cut-off of the source voltage to the main computer block.

Additionally, the remote control method must utilize a receiver for receiving a remote control signal from a transmitter. In this method, the stand-by current from the SMPS in the computer system must be continuously supplied for the receiver in order that the receiver can receive and detect the remote control signal. If the detected signal is related to the supply control of the source voltage, the source voltage is supplied for the main computer block. In this method, since the source voltage is always supplied for the receiver so that a processor and a logic circuit therein may be operated, power is continuously consumed. The receiver can also be affected by other remote control devices used in other electrical products. This method has a disadvantage in that an additional power switch must be embodied in the computer system to control the supply or the cut-off of a source voltage thereto.

Finally, according to the method for restarting the supply of the source voltage to the main computer block in accordance with the specific key input signal of the keyboard, a data line of the keyboard is activated by soft-touching of the keyboard and then the power is supplied for the main computer block. Since the computer system detects only whether the data line is activated during the cut off of the source voltage, an undesirable source voltage can be supplied thereto when the keyboard is touched by mistake or an intention by another person. This method also has a disadvantage in that it is necessary for an additional function to cut off the supply of the source voltage. Particularly, the computer system in which the method is embodied must be operated in order that a power supply, therein is in a wake-up state during the standby-mode or hibernation mode.

Earlier computer systems have a main computer body (i.e., a main computer block), input devices such as a keyboard and a mouse and output devices such as a monitor and speakers. The speakers can be built into the main computer body or separately provided. Several switches, such as a power switch, a built-in microphone ON/OFF switch, and a reset switch, etc., are installed on a front panel of the main computer body to control several functions of the computer system. The reset switch is used for resetting and booting the computer system and the power switch is used for controlling the supply and the cut-off of the source voltage to the main computer block.

The AC source voltage is supplied through power lines to an SMPS of the computer body via the power switch when the power switch is closed.

A reset generator, included in the main computer body, generates a reset signal for resetting the main computer block upon the operation of the reset switch. When the reset signal is generated by the reset signal generator, a booting program is performed in the main computer block to initialize and restart the operation of the main computer block. The reset signal generator may be composed of two capacitors connected in parallel across the terminals of the reset switch, a resistor connected to a DC voltage source and with the one of the two capacitors and an inverter connected to the junction of the resistor and the two capacitors. The reset switch has two terminals, one of which is grounded and the other which is connected to the junction of the capacitors and the resistor. Accordingly, when the reset switch is closed, an integrated signal is generated by an integrator circuit composed of the resistor and the capacitors, the integrated signal then being changed into a pulse signal by means of the inverter. This pulse signal is used as the reset signal.

Since the computer system has the reset switch for initializing the operation thereof in addition to the power switch for controlling the supply of source voltage to the power supply therein, the above described problems may occur.

The Clark et al. patent, U.S. Pat. No. 5,513,359, entitled Desktop Computer Having A Single-Switch Suspend/Resume Function, discloses a computer system in which a momentary pushbutton switch controls a state of the computer between a normal operating state, a suspend state, and an off state.

The White et al. patent, U.S. Pat. No. 5,410,713, entitled Power-Management System For A Computer, discloses a power management system for a computer in which the ON/OFF control of the computer is controlled by a switch which does not control the AC power but rather provides a signal to control the operation of a switchable power supply.

The Inoue, Folkes et al., and Conary patents, U.S. Pat. Nos. 5,008,846, 5,570,050, and 5,543,741, respectively entitled Power And signal Supply Control Device, Zero Standby Current Power-Up Reset Circuit, and Reset Circuit For Generating Reset Pulse Over An Interval Of Reduced Voltage Supply, each disclose computer systems in which a reset signal is automatically generated upon the power being supplied to the computer system.

The following additional patents each disclose features in common with the present invention but are not believed to be as pertinent as the patents discussed above:

U.S. Pat. No. 5,543,741 to Purits, entitled Reset Circuit For Generating Reset Pulse Over An Interval Of Reduced Voltage Supply, U.S. Pat. No. 4,614,880 to Go et al., entitled Power Supply Circuitry For A Microcomputer System, U.S. Pat. No. 5,237,698 to Ohmae, entitled Microcomputer, U.S. Pat. No. 5,442,310 to Bazes, entitled Circuitry And Method For Reset Discrimination, and U.S. Pat. No. 5,513,358 to Lundberg et al., entitled Method And Apparatus For Power-Up State Initialization In A Data Processing System.

None of the cited patents teaches or suggests the specifically recited combination of the features of the present invention.

SUMMARY OF THE INVENTION

It is therefore an object of the present invention to provide a computer system which can control the supply and the cut-off of the source voltage to the main computer block by means of a reset switch provided for resetting the main computer block without the use of a power switch.

It is another object of the present invention to provide a computer system which can control the cut off of the source voltage to the main computer block by the combination of specific key input signals or by programming.

According to one aspect of the present invention, a computer system, comprises a main computer block having a microprocessor unit (MPU); a reset switch for resetting the MPU and starting a booting program of the main computer block; and a power supply section for starting a supply of source voltage to the main computer block by means of the reset switch and cutting off the supply of the source voltage to the main computer block in accordance with either the combination of specific key input signals or a control signal occurring from the main computer block when a specific program performed in the main computer block has been terminated.

Preferably, said section comprises a switching mode power supply (SMPS) for generating a source voltage, a stand-by voltage and a normal power supply indication signal indicative of a continuous supply of the source voltage to the main computer block, and for controlling the supply of source voltage to the main computer block in response to a power-on signal or a power-off signal, a power-on signal generator operated with the stand-by voltage, for generating the power-on signal when the reset switch is operated; and a power-off signal generator for generating a power-off signs in response to either a combination of specific key input signals or a control signal from the main computer block by programming, wherein the supply of the source voltage to the main computer block is started and cut off by the combination of the specific key input signals or the control signal when the reset switch is switched.

Preferably, the computer system further comprises a reset signal generator operated by the stand-by voltage, for generating a reset signal to re-start the main computer block when the reset switch is operated.

Also the computer system further comprises a reverse current protecting element to prevent a reverse current from flowing through the reset switch to the reset signal generator or to prevent a reverse current from flowing through the reset switch to the power-on signal generator.

In the computer system, the first reverse current protecting element is composed of a first diode connected between the reset switch and the reset signal generator, and the second reverse current protecting element is composed of a second diode connected between the reset switch and the power-on signal generator.

In the computer system, the power-on signal generator comprises a trigger signal generator for generating a trigger signal when the reset switch is operated and a flip-flop circuit for generating the power-on signal in synchronization with the trigger signal until the flip-flop circuit is cleared by a clear signal.

In the computer system, the power-off signal generator comprises a keyboard controller for detecting when the combination of the specific key input signals has been selected by a keyboard and for generating a first control signal corresponding to the combination, and a clear signal generator for generating the clear signal by either the first control signal or a second control signal generated by the main computer block when a specific program performed in the main computer block has been completed, whereby the power-off signal is generated by reversion of the power-on signal from the power-on signal generator in response to the clear signal.

In the computer system, the leakage current preventing element comprises a means to prevent a leakage current from flowing through the main computer block or the keyboard controller.

In the computer system, the leakage current preventing element is composed of a transistor having a base for receiving the normal power supply indication signal, a collector for receiving the first and second control signals and an emitter connected to a clear terminal of the flip-flop circuit.

In the computer system, the specific program performed in the main computer block is an operating system.

In the computer system, the operating system may be WINDOWS 95, a graphic user interface program or a word processor.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF PREFERRED EMBODIMENT

Figure 1:
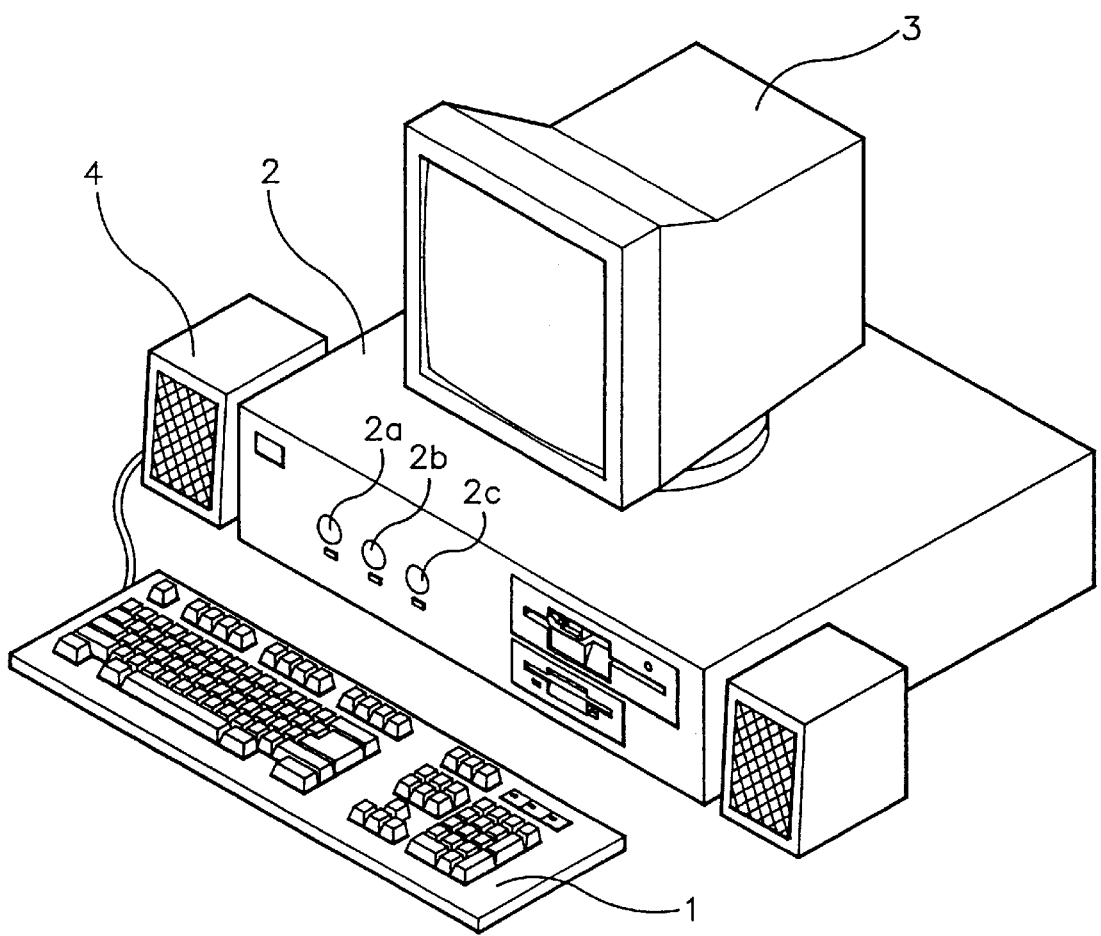
FIG. 1 is a perspective view showing the construction of a computer system.

As shown in FIG. 1, an earlier computer system has a main computer body 2 (i.e., a main computer block), input devices such as a keyboard 1 and a mouse (not shown), and output devices such as a monitor 3 and a pair of speakers 4. The speakers can be built into the main computer body 2 or separately provided therefrom. As an auxiliary memory device, a floppy disk drive is included in the computer body 2. Also, several switches, such as a power switch 2a, a built-in mike ON/OFF switch 2b and a reset switch 2c, etc. are installed on a front panel of the main computer body 2 to control several functions of the computer system. The reset switch 2c is used for resetting and booting the computer system and the power switch 2a is used for controlling the supply and the cut-off of the source voltage to the main computer block.

Figure 2:
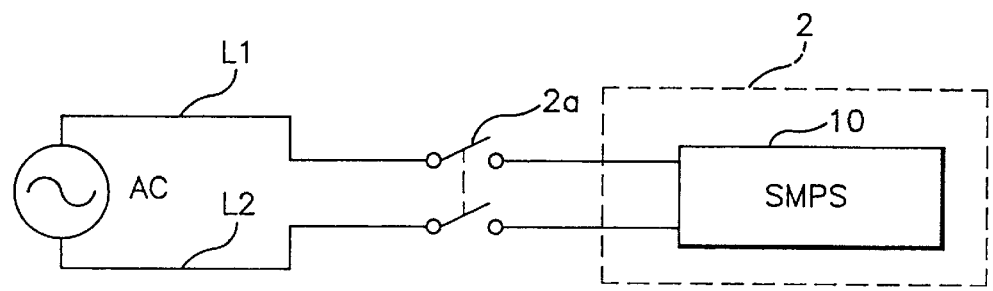
FIG. 2 is a circuit diagram of the computer system of FIG. 1 in which an AC source voltage is supplied to a switching mode power supply by means of a power switch.

With reference to FIG. 2, it is shown that the supply and the cut-off of an AC source voltage to the main computer body 2 are controlled by means of the power switch 2a. The AC source voltage is supplied through the power lines L1 and L2 to an SMPS 10 of the computer body 2 when the power switch 2a is closed.

Figure 3A:
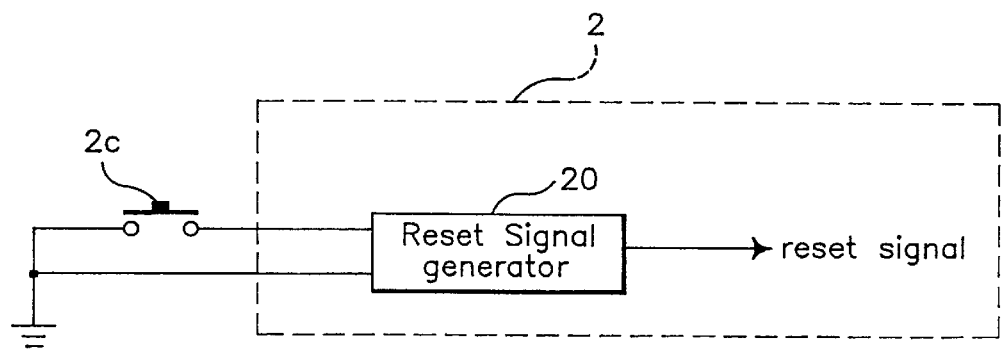
FIG. 3A is a block diagram showing a reset signal generator for generating a reset signal by means of the reset switch shown in FIG. 1.
Figure 3B:
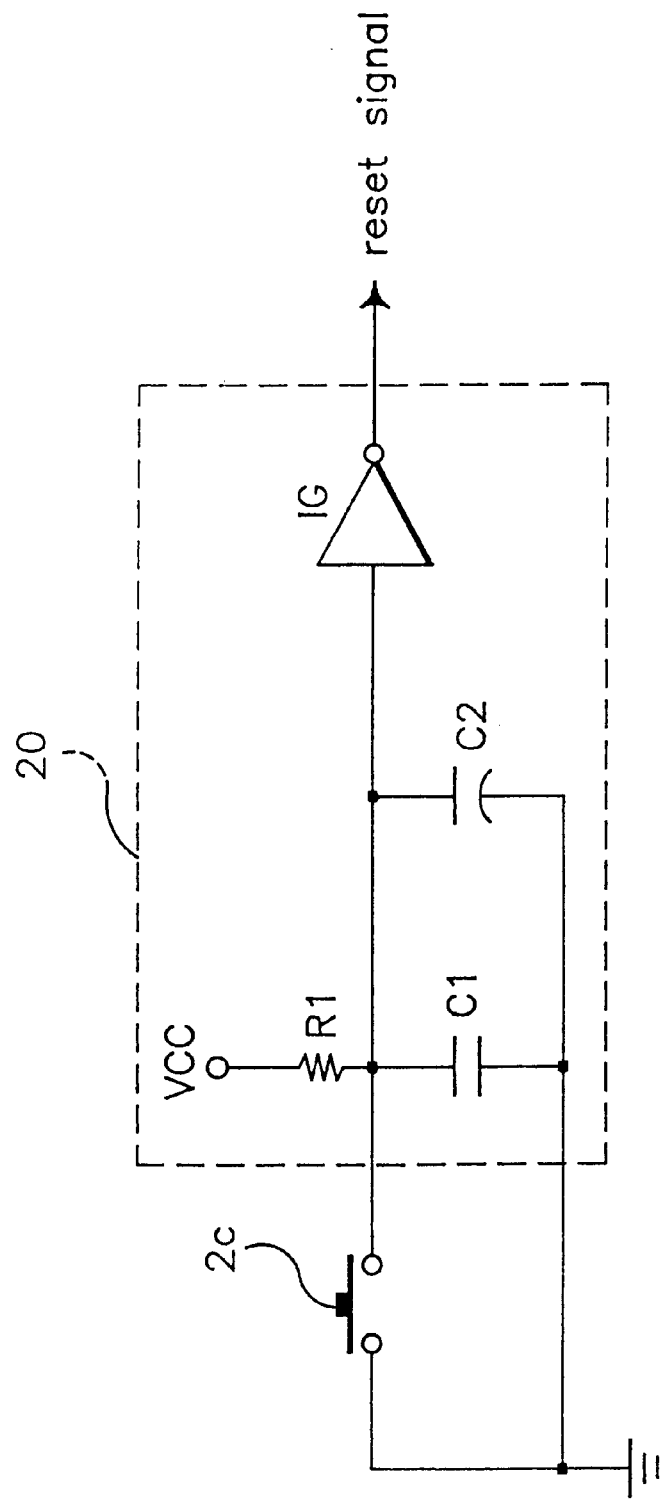
FIG. 3B is a detailed circuit diagram of the reset signal generator shown in FIG. 3A.

FIG. 3A is a circuit diagram of a reset signal generator 20 included in the main computer body 2. The reset signal generator 20 generates a reset signal for resetting the main computer block by means of the reset switch 2c. When the reset signal is generated by the reset signal generator, a booting program is performed in the main computer block to initialize and restart the operation of the main computer block. The reset signal generator 20 is, as shown in FIG. 3B, composed of two capacitors C1 and C2 connected in parallel across the terminals of the reset switch 2c, a resistor R1 connected in series with the capacitor C1, and an inverter IG. The reset switch 2c has two terminals, one of which is grounded and the other of which is connected through a connection point of the resistor R1 and the capacitor C1, which are connected in series between a DC voltage source Vcc and a ground, to an input terminal of the inverter IG. Accordingly, when the reset switch 2c is closed, an integrated signal is generated by an integrator circuit which is composed of the resistor R1 and the capacitor C2, and then changed into a pulse signal by means of the inverter IG. This pulse signal is used as the reset signal.

Since the above computer system has the reset switch 2c for initializing the operation thereof in addition to the power switch 2a for controlling the supply of source voltage to the power supply therein, the above described problems may occur.

Figure 4:
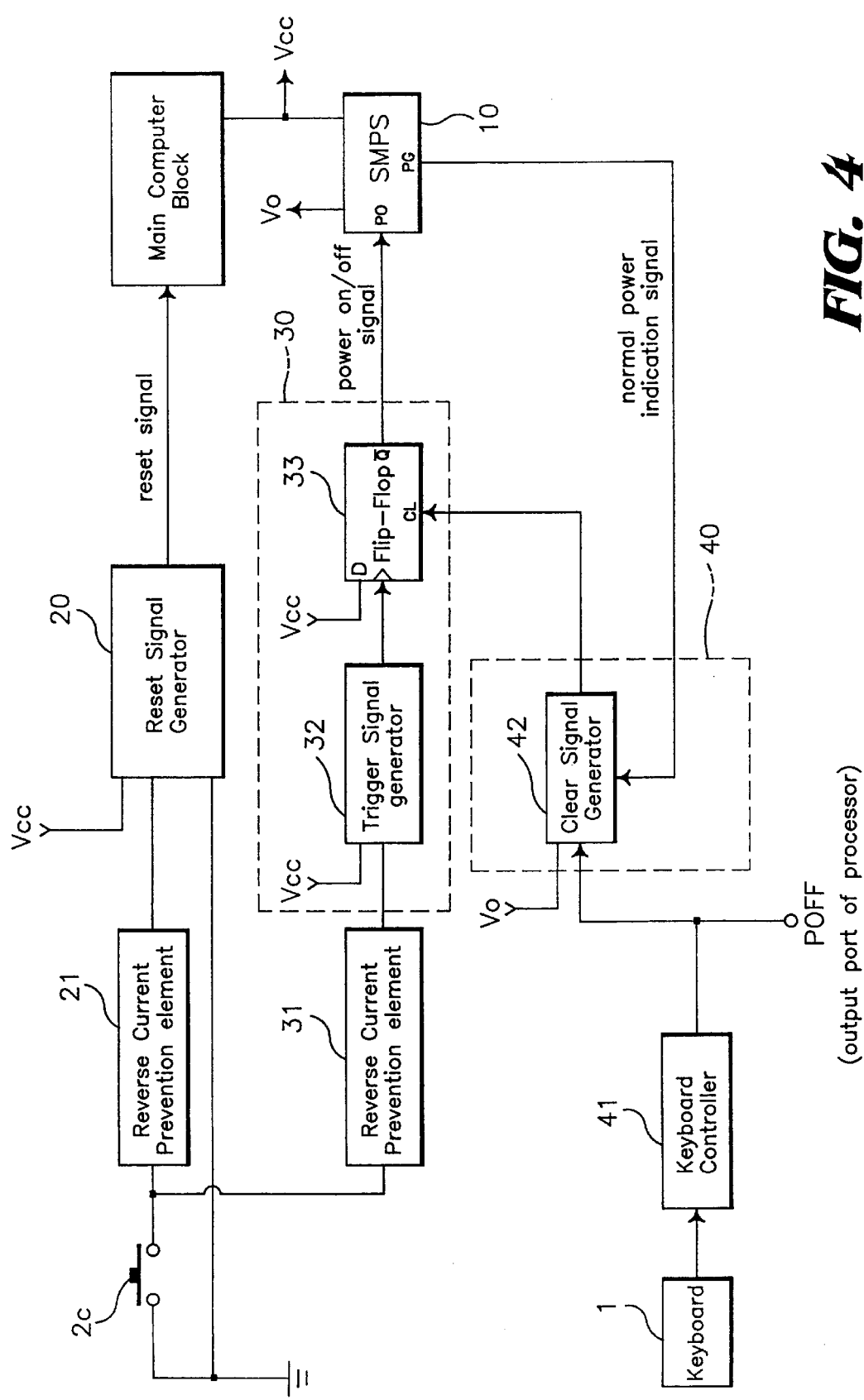
FIG. 4 is a block diagram showing the construction of a novel computer system with a simplified power control section in which the supply of a source voltage thereto is started or cut off by means of a reset switch in accordance with one embodiment of the present invention.

Referring to FIG. 4, a novel computer system with a simplified power control section in accordance with the present invention has a reset switch 2c for resetting a main computer block having a microprocessor unit therein and for starting a booting program of the main computer block and a power supply section for starting a supply of source voltage to the main computer block by means of the reset switch 2c and for cutting off the supply of source voltage to the main computer block in accordance with either the combination of specific key input signals or a control signal occurring from the main computer block when a specific program performed in the main computer block has been terminated.

The power supply section has a switching mode power supply 10 (hereinafter, referred to as an "SMPS") for generating a source voltage Vo, a stand-by voltage Vcc and a normal power supply indication signal indicative of a continuous supply of the source voltage to the main computer block and for controlling the supply of the source voltage to the main computer block in response to a power-on signal or a power-off signal, a power-on signal generator 30 operated by the stand-by voltage Vcc, for generating the power-on signal and providing it to the SMPS 10 when the reset switch 2c has been operated, and a power-off signal generator 40 for generating a clear signal to allow the power-on signal to be changed to the power-off signal.

As shown FIG. 4, the SMPS 10 produces the operation source voltage Vo and a normal power supply indication signal while receiving the power-on signal, but cuts off the supply of the source voltage Vo to the main computer block while receiving the power-off signal. The SMPS 10 always produces the stand-by voltage Vcc regardless of the presence of the power-on signal or the power-off signal. The power supply section of the present invention is operated by the stand-by voltage Vcc. The power-off signal is generated by the power-off signal generator 40 when the generator 40 receives either the combination of specific key input signals from a keyboard 1 via a keyboard controller 41 or a control signal generated by a program from an output port POFF of a main computer block having a microprocessor unit (MPU).

Herein, the "program" means a specific program installed in a memory device of the main computer block to allow the control signal to be generated by the main computer block when an operating program or a word processing program is terminated in the main computer block. The operating program may be composed of a WINDOWS 95 operating system or a graphic user interface program.

Hereinafter, the operation of the computer system will be described with reference to FIG. 4, the computer system generating a power-on signal to control the supply of voltage to the main computer block and provided to the SMPS 10.

With reference to FIG. 4, if the reset switch 2c is operated so as to be momentarily grounded a reset signal is produced by the reset signal generator 20, so that processors such as a main computer block and one-chip microcomputer system in the computer system are initialized by using the reset signal. At the same time, the computer system allows a booting program to be started.

The reset signal generator 20 may be operated with either the stand-by voltage Vcc from the SMPS 10 or a battery voltage (not shown) from a battery located in the main computer block. The computer system of the present invention further includes a reverse current protecting element 21, which is connected between the reset switch 2c and the reset signal generator 20, to prevent a reverse current from being induced through the reset switch 2c to the reset signal generator 20. Also the reset signal generator 20 may be additionally provided with the reverse current protecting element 21.

On the other hand, if the reset signal is generated by the reset signal generator 20 by means of the reset switch 2c, a power-on signal is generated from the power-on signal generator 30 at the same time and provided to the SMPS 10. At this time, the SMPS 10 produces an operation source voltage Vo in response to the power-on signal. The source voltage starts to be supplied to component parts of the computer system. As a result, the computer system is operated in accordance with a normal power supply mode.

The power-on signal generator 30 is composed of a trigger signal generator 32 for generating a triggered pulse signal when the reset switch 2c is operated and a flip flop circuit 33 for generating the power-on signal in synchronism with the triggered pulse signal. The computer system further includes another reverse current protecting element 31, which is connected between the reset switch 2c and the trigger signal generator 32, to prevent a reverse current from being induced through the reset switch 2c to the trigger signal generator 32. Also the power-on signal generator 30 may be additionally provided with the reverse current protecting element 31.

The operation of the computer system will be hereinafter described in detail with reference to FIG. 4, the computer system generating a power-off signal for cutting off the supply of voltage to the main computer block and provided to the SMPS 10.

As mentioned above, if the source voltage is normally supplied from the SMPS 10 to the main computer block, i.e. if the computer system is actually operated in accordance with a normal power supply mode, a normal power supply indication signal is generated by the SMPS 10. The power-on signal is continuously generated by the power-on signal generator 30.

During the normal supply of source voltage to the main computer block, if specific key input signals are provided from the keyboard 1, the keyboard controller 41 detects the combination of the specific key input signals and generates a power-off enable signal corresponding to the combination of key input signals. Also, although not shown in the figures, when a specific program being performed has been completed, a control signal is generated through the output port POFF of the main computer block and used as the power-off enable signal.

If the power-off enable signal is generated by the keyboard controller 41 or the output port POFF of the main computer block (not shown) during the presence of the normal power supply indication signal, a clear signal is generated by the clear signal generator 42 to clear the flip-flop 33 of the power-on signal generator 30. As a result, the flip-flop 33 outputs the power-off signal into which the power-on signal is changed while the flip-flop 33 is in a clear state.

Accordingly, when the SMPS 10 receives the power-off signal, the source voltage from the SMPS 10 to the main computer block is cut off.

As described above, the computer system according to the present invention can control the supply of voltage thereto by using only the reset switch 2c and intercept the supply of source voltage by means of the combination of specific key input signals or a control signal which is generated by a main computer block thereof when a specific program being performed in the main computer block has been terminated.

Figure 5:
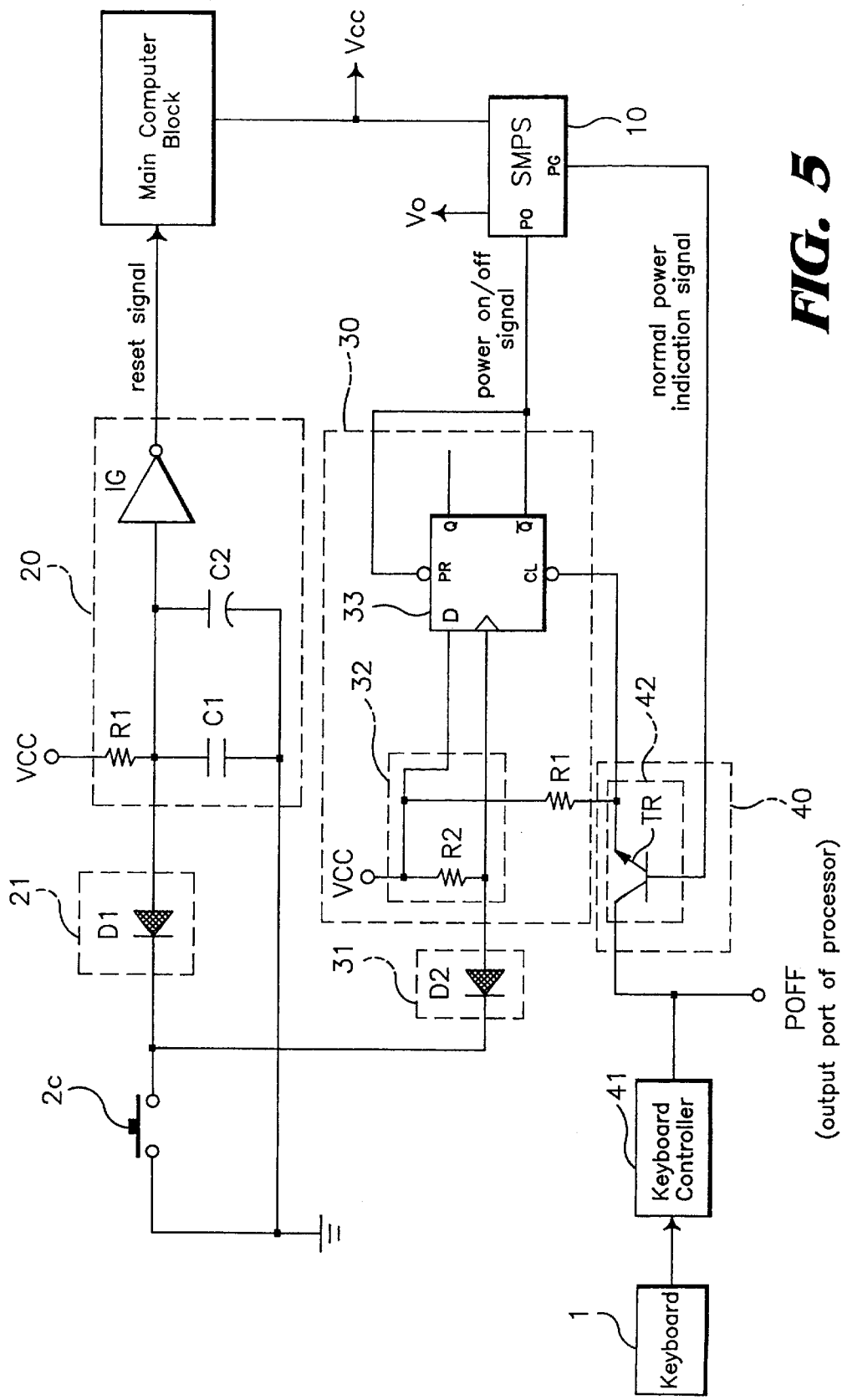
FIG. 5 is a detailed circuit diagram of the computer system shown in FIG. 4.

FIG. 5 is a detailed circuit diagram of the power supply section of the computer system shown in FIG. 4, and the same components as those in FIG. 3B are indicated by the same reference numerals Also the reset signal generator 20 of the FIG. 5 has the same construction as the reset signal generator 20 of FIG. 3B except that a reverse current protecting diode D1 has been provided between the reset switch 2c and the reset signal generator 20 to prevent a reverse current from being induced through the reset switch 2c to the generator 20, and descriptions thereof has been omitted.

Turning again to FIG. 5, when the reset switch 2c is momentarily operated, the battery voltage or the stand-by voltage Vcc from the SMPS 10 is grounded through a resistor R2, a reverse current protecting diode D2 and the reset switch 2c. At this time, a triggered pulse signal is generated through the resistor R2 to be supplied to a clock terminal of a flip-flop 33. The flip-flop 33 outputs a power-on signal of a low level (i.e., ground level) through an output terminal $\overline{Q}$, because a signal of a high level (i.e., Vcc level) is always supplied to an input terminal D. The power-on signal of a low level is supplied to the SMPS 10, so that the source voltage from the SMPS starts to be supplied to the main computer block. At the same time, the low level power-on signal is again provided to a preset-set terminal of the flip-flop 33 so that the flip-flop 33 is preset and thus the power-on signal from the output terminal $\overline{Q}$ is always at a low level.

Also, the SMPS 10 produces a normal power supply indication signal of a high level, which indicates the normal supply of source voltage to the main computer block, during the presence of the power-on signal. The normal power supply indication signal allows an NPN transistor TR to be conductive. As a result, a power-off enable signal of a low level from a keyboard controller 41 or a control signal supplied through an output port POFF of the main computer block (not shown) can be supplied through the conducting transistor TR to a clear terminal of the flip-flop 33. The power-off enable signal is generated by the keyboard controller when specific key input signals have been inputted by means of the keyboard 1. The control signal, which is output from the main computer block when one of a specific group of programs such as an operating program and a program for a word processor or user graphic interface has been terminated, is also used as the power-off enable signal. If the transistor TR is not conductive, the signals can not be supplied through the transistor TR to the clear terminal of the flip-flop. Accordingly, the transistor TR functions as a clear signal generator 42 for receiving the power-off enable signal and for generating a clear signal, and also can prevent a leakage current from being induced from the keyboard controller 41.

On the other hand, if the above power-off enable signal is generated by the keyboard controller 41 or the main computer block during the presence of the power-on signal, a clear signal occurring from the transistor TR is supplied to the clear terminal of the flip-flop 33. Then, the flip-flop 33 is cleared to output a power-off signal of a high level through the output terminal $\overline{Q}$. Namely, the power-on signal of a low level from the output terminal $\overline{Q}$ is changed into the power-off signal of a high level immediately after the flip-flop 33 is cleared. As a result, the SMPS 10 cuts off the supply of voltage to the main computer block.

Since the power-on signal continues to be generated by the flip-flop 33 until the flip-flop 33 is cleared, the computer system can be continuously operated with the normal source voltage during the presence of the power-on signal even though the reset switch 2c has been operated once or several times.

As described above, the computer system of the present invention allows one to control the supply of source voltage to the main computer block by using a reset switch without the use of a power switch, and to cut off the supply of the source voltage by the combination of specific key input signals or a control signal outputted from a main computer block when a specific program to be performed in the main computer block has been terminated. Accordingly, the computer system can be embodied without a power switch.

In addition, because it is possible to control the supply of source voltage to the computer system only by using the reset switch without the power switch, users can operate the computer system with ease. Also, because the supply of source voltage to the main computer block can be cut off only by the combination of specific key input signal or the termination of a specific program to be performed in the main computer block, it is possible to prevent the working interruption, data loss or network break from occurring due to a user mistake or intention by another person during operation of the computer system. Furthermore, the computer system allows one to considerably reduce the current consumption because the supply of source voltage to the main computer block can be automatically cut off only when a specific program, particularly an operating system has been terminated.

It should be understood that the present invention is not limited to the particular embodiment disclosed herein as the best mode contemplated for carrying out the present invention, but rather that the present invention is not limited to the specific embodiments described in this specification except as defined in the appended claims.

What is claimed is:

1. A computer system with a simplified power supply control function, comprising:

a main computer block;

a reset switch for resetting the main computer block and starting a booting program of the main computer block; and a power supply section for starting a supply of source voltage to the main computer block by the reset switch being operated and for cutting off the supply of source voltage to the main computer block in accordance with one of either the combination of specific key input signals or a control signal outputted from the main computer block when a specific program to be performed in the main computer block has been terminated;

wherein said power supply section comprising:

a switching mode power supply for generating a source voltage, a standby voltage and a normal power supply indication signal indicative of a continuous supply of the source voltage to the main computer block, and for controlling the supply of source voltage to the main computer block in response to a power-on signal or a power-off signal;

a power-on signal generator operated with the stand-by voltage, for generating the power-on signal when the reset switch is operated; and a power-off signal generator for generating a power-off signal in response to one of either the combination of specific key input signals or the control signal outputted from the main computer block due to programming, the supply of the source voltage to the main computer block being started and cut off by one of the combination of the specific key input signals or the control signal when the reset switch is operated;

wherein and said power-off wherein signal generator comprising:

a keyboard controller for detecting whether the combination of the specific key input signals has been selected by a keyboard and for generating a first control signal corresponding to the combination, and a clear signal generator for generating a clear signal by one of either the first control signal or a second control signal generated by the main computer block when a specific program to be performed in the main computer block has been terminated, the power-off signal being generated by reversion of the power-on signal from the power-on signal generator in response to the clear signal.

2. The computer system of claim 1, further comprising a reset signal generator operated with the stand-by voltage, for generating a reset signal to re-start the main computer block when the reset switch has been operated.

3. The computer system of claim 2, further comprising a first reverse current protecting element to prevent a reverse current from flowing through the reset switch to the reset signal generator.

4. The computer system of claim 3, further comprising a second reverse current protecting element to prevent a reverse current from flowing through the reset switch to the power-on signal generator.

5. The computer system of claim 3, the first reverse current protecting element comprising a first diode connected between the reset switch and the reset signal generator.

6. The computer system of claim 4, the second reverse current protecting element comprising a second diode connected between the reset switch and the power-on signal generator.

7. The computer system of claim 1, the power-on signal generator comprising a trigger signal generator for generating a trigger signal when the reset switch has been operated and a flip-flop circuit for generating the power-on signal in synchronism with the trigger signal until the flip-flop circuit is cleared by a clear signal.

8. The computer system of claim 7, the clear signal generator comprising a leakage current preventing element for preventing a leakage current from flowing through the main computer block or a keyboard controller.

9. The computer system of claim 8, the leakage current preventing element comprising a transistor having a base for receiving the normal power supply indication signal, a collector for receiving the first and second control signals and an emitter connected to a clear terminal of a flip-flop circuit.

10. The computer system of claim 7, the specific program to be performed in the main computer block being an operating system.

11. The computer system of claim 10, the operating system being a program for a graphic user interface.

12. The computer system of claim 7, the specific program being a program for a word processor.

13. A computer system with a simplified power supply control function, comprising:

a main computer block;

a reset switch for resetting the main computer block and starting a booting program of the main computer block; and a power supply section for starting a supply of source voltage to the main computer block by the reset switch being operated and for cutting off the supply of source voltage to the main computer block in accordance with a control signal outputted from the main computer block when a specific program to be performed in the main computer block has been terminated;

wherein said power supply section comprising:

a switching mode power supply for generating a source voltage, a standby voltage and a normal power supply indication signal indicative of a continuous supply of the source voltage to the main computer block, and for controlling the supply of source voltage to the main computer block in response to a power-on signal or a power-off signal;

a power-on signal generator operated with the stand-by voltage, for generating the power-on signal when the reset switch is operated; and a power-off signal generator for generating the power-off signal in response to the control signal outputted from the main computer block due to closing of specific programming, so that the supply of the voltage to the main computer block cut off by the control signal.

14. A computer system with a simplified power supply control function, comprising:

a main computer block;

a reset switch for resetting the main computer block and starting a booting program of the main computer block; and a power supply section for starting a supply of source voltage to the main computer block by the reset switch being operated and for cutting off the supply of source voltage to the main computer block in accordance with the combination of specific key input signals when a specific program to be performed in the main computer block has been terminated;

wherein said power supply section comprising:

a switching mode power supply for generating a source voltage, a standby voltage and a normal power supply indication signal indicative of a continuous supply of the source voltage to the main computer block, and for controlling the supply of source voltage to the main computer block in response to the power-on signal or a power-off signal;

a power-on signal generator operated with the stand-by voltage, for generating the power-on signal when the reset switch is operated; and a power-off signal generator for generating the power-off signal in response to the combination of the specific key input signal, the supply of the source voltage of the main computer block being started and cut off by the combination of the specific key input signals when the reset switch is operated;

wherein said power-off signal generator comprising a clear signal generator for generating a clear signal by a control signal generated by the main computer block when a specific program to be performed in the main computer block has been terminated, the power-off signal being generated by reversion of the power-on signal from the power-on signal generator in response to the clear signal.

* * * * *